United States Patent [19]

Mariel

[11] Patent Number: 5,749,174
[45] Date of Patent: May 12, 1998

[54] WINDOW REGULATOR WITH SPRING RETAINER

[75] Inventor: James Gregory Mariel, Mishawaka, Ind.

[73] Assignee: Excel Industries, Inc., Elkhart, Ind.

[21] Appl. No.: 613,362

[22] Filed: Mar. 11, 1996

[51] Int. Cl.⁶ ..................................................... E05F 11/01
[52] U.S. Cl. ................................................. 49/352; 49/360
[58] Field of Search ................................. 49/352, 348, 360

[56] References Cited

U.S. PATENT DOCUMENTS

| | | |
|---|---|---|
| 911,701 | 2/1909 | Campbell . |
| 3,444,649 | 5/1969 | Rivolier . |
| 3,890,743 | 6/1975 | Eckhardt et al. ............. 49/352 |
| 4,090,329 | 5/1978 | Rampel . |
| 4,235,046 | 11/1980 | Hess et al. . |
| 4,313,282 | 2/1982 | Hagamann et al. ............. 49/352 |
| 4,630,398 | 12/1986 | Schust . |
| 4,840,080 | 6/1989 | Kobayashi et al. . |
| 4,970,827 | 11/1990 | Djordjevic . |
| 4,984,386 | 1/1991 | Marscholl et al. . |
| 5,074,077 | 12/1991 | Toyoshima et al. . |
| 5,359,811 | 11/1994 | Klippert . |
| 5,367,827 | 11/1994 | Tajima et al. ............. 49/352 |

FOREIGN PATENT DOCUMENTS

| | | |
|---|---|---|
| 0 208 603 A | 1/1987 | European Pat. Off. . |
| 607588 | 6/1994 | European Pat. Off. ............. 49/352 |
| 697589 | 6/1994 | European Pat. Off. ............. 49/352 |
| 2 441 711 A | 6/1980 | France . |
| 26 56 428 A | 6/1978 | Germany . |
| 30 07 653 A | 9/1981 | Germany . |
| 26 60 322 C | 7/1983 | Germany . |
| 38 09 281 A | 9/1989 | Germany . |
| 406173529 | 6/1994 | Japan ........................ 49/352 |

*Primary Examiner*—Jerry Redman
*Assistant Examiner*—Curtis Cohen
*Attorney, Agent, or Firm*—Banner & Witcoff, Ltd.

[57] ABSTRACT

A cable-drum window regulator with a spring cable tensioner is provided with a spring retainer assembly securing the spring to the cable. The spring retainer is advantageously assembled prior to final installation of the cable into the regulator mechanism. The retainer assembly comprises a retainer with a hollow interior sized to receive the cable and the spring, having an opening at one end sized to allow passage of the cable but not the spring, and an endpiece with one or more projections which preferably snap fit together with the retainer, securing or capturing the spring between the retainer and the endpiece. The retainer may have snap fit projections which captivate the endpiece, or alternatively, the endpiece may have snap fit projections which captivate the retainer. The endpiece may be attached to the cable directly or indirectly onto a conduit. The cable has cable end balls which are used to attach the cable to the drive means. In one embodiment the end balls are attached to the cable before the retainer assembly is attached, so a slot is provided to allow the insertion of the cable into the retainer assembly. The retainer and the mounting bracket may be of unitary construction.

23 Claims, 3 Drawing Sheets

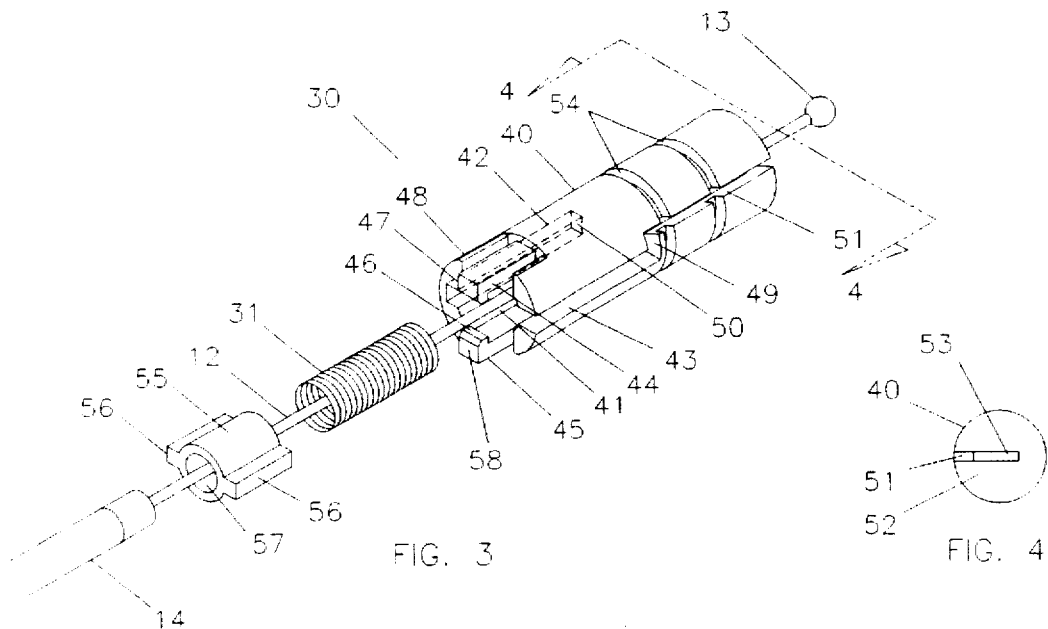
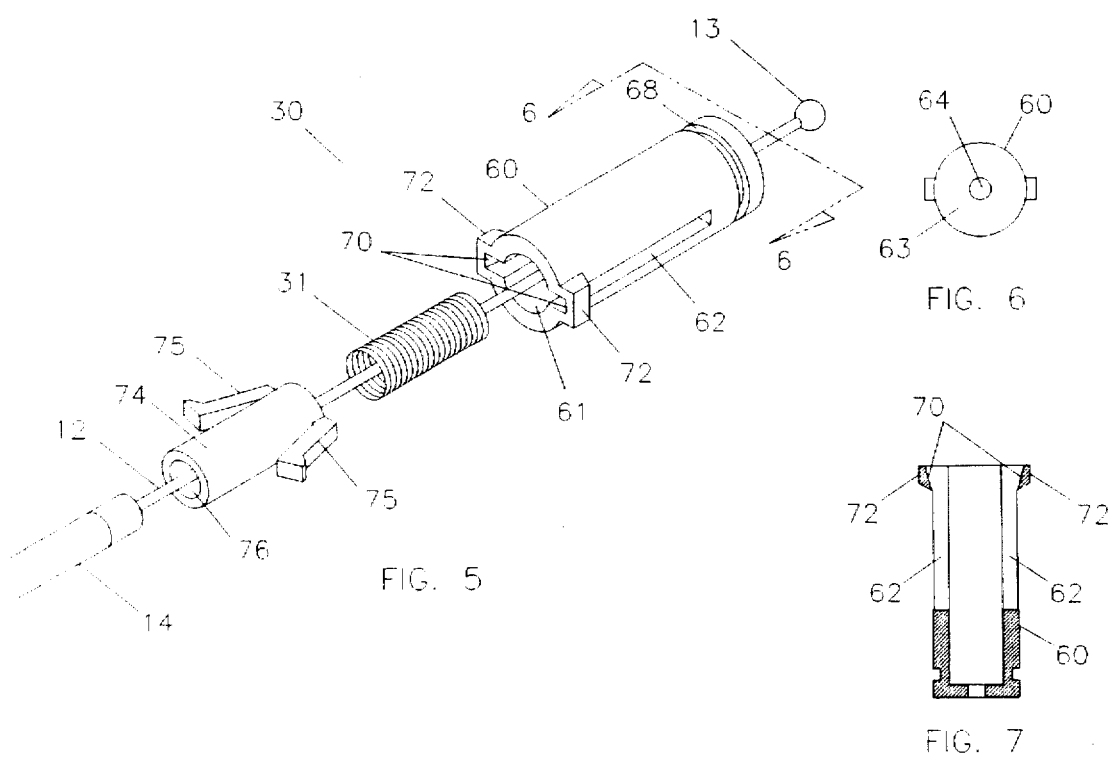

WINDOW REGULATOR WITH SPRING RETAINER

FIELD OF THE INVENTION

The present invention is directed to an improved cable-drum regulator assembly for controlling the position of a windowpane in an opening. More particularly, the invention is directed to a cable-drum regulator assembly having an improved retainer for a cable slack take-up mechanism.

BACKGROUND

Window regulators, which are used for controlling the movement of a windowpane, such as a vertically moveable side window in the door of a motor vehicle, take a variety of forms including cable-drum regulators. Known designs for cable-drum regulators typically include a drive means, such as a hand crank or an electric motor, a mounting bracket securing the assembly to a wall of the door, a drum, a drum housing mounted to the mounting bracket, and at least one cable wrapped at least once around the drum.

Cables typically have a ball or puck of metal at each end to prevent fraying and to provide a ready means for attaching the cable to another structure. In the most common designs a pair of cables are used. One ball of each cable fits into a corresponding receiving groove in the drum to secure each cable at one end. The other end of each cable has a ball that fits into a receiving groove in a glider assembly. The glider assembly is usually fixedly attached to the window and slidingly attached to a track or rail. The cable is guided from the glider assembly to the motor by guide means, such as sliders or pulleys. The cable is often covered with a sheath or conduit over at least a portion of its travel path to protect it from dirt, oil, the elements and the like. Operation of the motor or hand crank causes the drum to rotate. This unwinds cable in one direction and winds cable in the other direction. As the cable moves, it pulls the glider assembly and in turn, the window. In this way the cables transfer the necessary forces from the drive means to the glider assembly to raise and lower the window.

During operation, the cables may become temporarily slack when the windowpane reaches either end of its travel path, that is "full up" or "full down". In addition, repeated cycling will cause wear in the system which can decrease the cable travel path, causing the cable to become slack. This could cause excessive shock loading on the regulator during operation and may cause the cable to misroute or fall off the drum, sliders or pulleys. This slackness is taken up in some systems by springs.

In known designs that use springs to take up the slackness in the system, a pair of springs are used, commonly positioned between an endpiece and a projection of the drum housing. The endpiece has one end provided with an enlarged diameter that fits over the conduit/cable subassembly, and another end that slidingly fits into the drum housing projection. The spring is positioned between the enlarged diameter end of the endpiece and the drum housing projection, fixing the motion of the spring between the end of the drum housing projection and the endpiece.

The springs bias the endpieces outward, away from the drum housing projections. This acts to extend the travel path of the cable until the system is taut, thereby minimizing shock loading. As the system wears the springs act to move the endpieces outward, that is, away from the drum housing, further extending the travel path of the cable, thereby taking up slack and maintaining tension in the system.

While this design solves the problems of slackness and shock loading, the design is awkward to assemble. Prior to final assembly, the endpiece and spring are attached over a free end of the cable. The cable end ball is inserted into the drive drum, and the cable is wrapped at least once around the drive drum. Known designs only secure the spring once the cable-endpiece/spring assembly is secured to the drum housing. Until that time all components are loose and the spring is still free to move on the cable. The spring can move down the cable and interfere with the attachment of the cable to the drive drum. In addition, the spring can fall off the assembly.

It is an object of the present invention to provide a cable-drum regulator of improved design which, especially in preferred embodiments, is easy to manufacture, reduces complexity and cost. Additional objects and features of the invention will become apparent from the following disclosure taken together with the detailed discussion of certain preferred embodiments.

SUMMARY

In accordance with a first aspect, a cable-drum regulator assembly is provided with a drive means, a mounting bracket supporting the drive means, a glider assembly fixedly attachable to a windowpane and siding on a rail or track, and a cable assembly to transfer the force of the drive means to open and close the windowpane. The cable assembly includes a cable and optionally a conduit covering a portion of the cable. The cable assembly has a tensioning device such as a spring to take up slack in the cable, and is provided with a retainer assembly to secure the tensioning device prior to complete assembly. The retainer assembly includes a retainer and an endpiece. The retainer has an open or receiving end and is generally in the shape of a cylinder, with a hollow interior sized to receive the cable and the spring. The retainer and endpiece fit together, most preferably snap fitting together, securing the spring in the hollow interior of the retainer.

In certain preferred embodiments the hollow retainer is provided with a pair of generally diametrically opposed, axially extending flexible fingers with radially inward projecting teeth or nubs or digits, along with a pair of diametrically opposed inwardly facing channels. The channels receive corresponding wings or projections of a cable endpiece. When the endpiece is inserted into the retainer, the wings are slidingly received in the channels; the fingers move outward, away from the endpiece until the endpiece passes the teeth, then the fingers snap back into position to captivate the endpiece and the spring/cable assembly therein. The axial travel of the endpiece is limited in one direction by the end of the retainer channels and in the other direction by the retainer fingers. The retainer may be a separate piece, or alternatively, the retainer and the mounting bracket can be made of a one-piece, unitary construction, reducing the number of parts in the assembly.

In accordance with certain alternative preferred embodiments, the endpiece has a pair of flexible lateral projections. The retainer has a pair of generally diametrically opposed, axially extending slots. Preferably the slots run along a significant portion of the length of the retainer. The slots are blocked by a barrier or stop at each end. The barrier at the endpiece receiving end of the retainer has a pair of diametrically opposed inwardly facing ramped grooves aligned with the slots. These inwardly facing grooves are designed to receive the endpiece projections. Once the endpiece is inserted past the barrier, the flexible projections snap radially outwardly into the opposing slots, securing the retainer and endpiece together. The axial travel of the endpiece is limited to the length of the slots.

3

Certain preferred embodiments can provide additional significant advantages with respect to assembly and installation. For example, in a highly advantageous feature of this invention, means are provided for routing the cable through the retainer assembly. In the first embodiment the retainer assembly can be provided with a slot to allow installation of a cable after the cable end ball or swage has been added to the cable assembly. In the second preferred embodiment the spring-retainer-endpiece assembly may be attached to the cable prior to the attachment of the cable end ball/puck to the cable assembly, allowing for reductions in the size of the openings in the retainer and a simplified retainer design.

Additional features and advantages of various preferred embodiments will be better understood in view of the detailed description provided below.

BRIEF DESCRIPTION OF THE DRAWINGS

Certain preferred embodiments are discussed below with reference to the appended drawings wherein:

FIG. 3 is an exploded perspective view of one embodiment of the retainer assembly;

FIG. 4 is an end view of the retainer without the cable, taken along the line 4—4 in FIG. 3;

FIG. 5 is an exploded perspective view of an alternative embodiment of the retainer assembly;

FIG. 6 is an end view of the retainer, taken along line 6—6 in FIG. 5; and

FIG. 7 is a view of the retainer shown partially in cross section through line 6—6 in FIG. 5.

Figure 1:
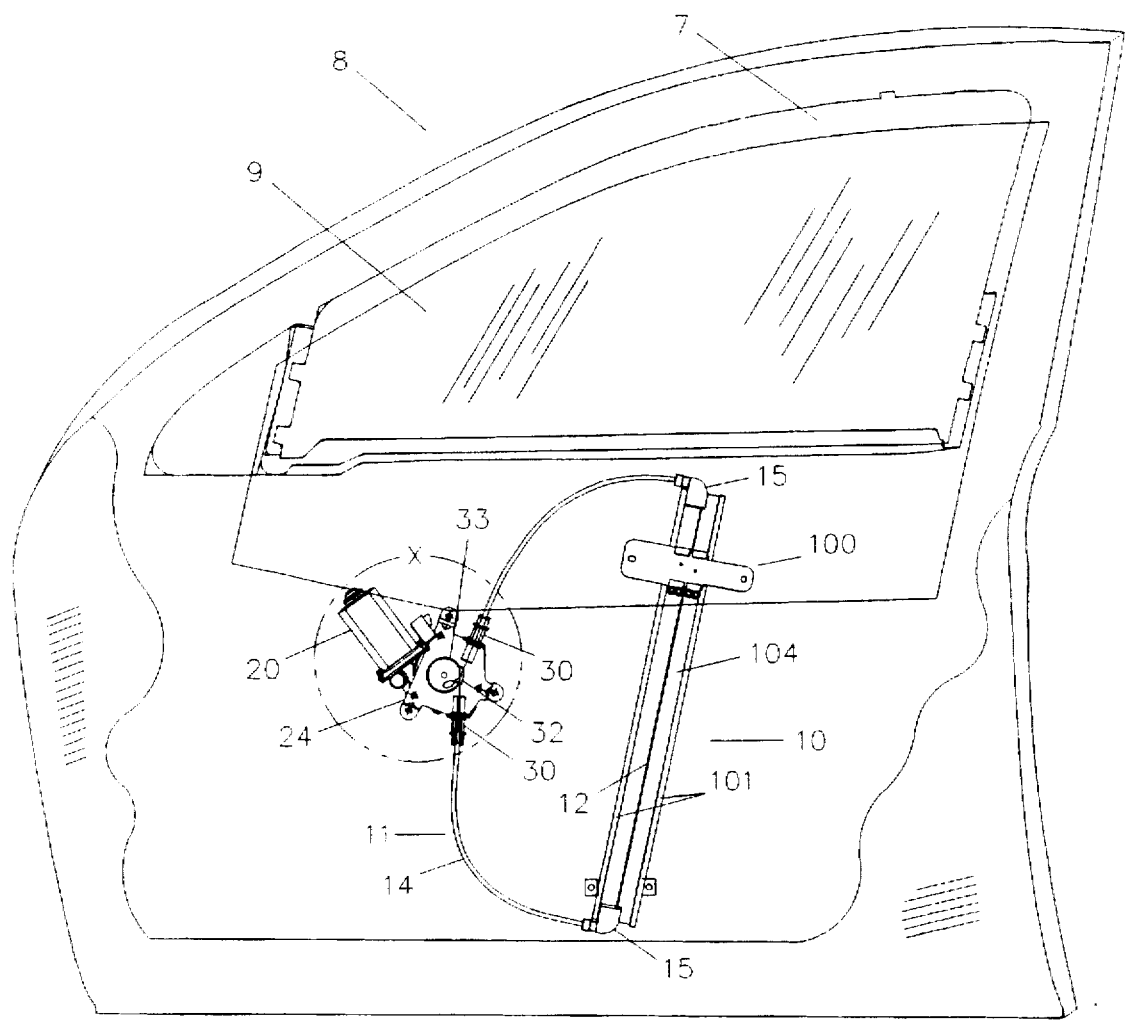
FIG. 1 is a schematic elevation view of a vehicle door defining a window opening in which is mounted a vertically slidable windowpane having a cable-drum regulator assembly in accordance with a preferred embodiment.

It should be understood that the appended drawings are not necessarily to scale, presenting a somewhat simplified representation of certain preferred embodiments illustrative of the basic principles of the invention. The specific design of cable-drum regulator assemblies in accordance with the invention, including, for example, the specific configuration and dimensions of various components, including the retainer assembly, will be determined in part by the intended application and use environment of the regulator assembly. Certain features of the cable-drum regulator assembly have been enlarged or distorted relative to others to facilitate visualization and clear understanding. In particular, thin features may be thickened, for example, for clarity of illustration. All references to direction and position, unless otherwise indicated, refer to the orientation of the cable-drum regulator assemblies illustrated in the drawings. It should be understood, however, that cable-drum regulator assemblies in accordance with the invention can be used in diverse applications.

DETAILED DESCRIPTION OF CERTAIN PREFERRED EMBODIMENTS

The improved cable-drum regulator assemblies illustrated in FIG. 1–7 are suitable for controlling a moveable windowpane to open and close a window opening in a motor vehicle door. The following discussion of certain preferred embodiments focuses on cable-drum regulator assemblies wherein the windowpanes are opened and closed by sliding action vertical with the ground, but the design and operating principles are applicable generally to windows which have alternative open/close directions.

Referring now to the cable-drum regulator assembly depicted in the drawings, in FIG. 1, a motor vehicle door 8 is shown to define a window opening 7 into which the windowpane 9 is pulled from a closed, full-up position to an open-down position by window regulator. The cable-drum regulator 10 is shown to have a drive means 20, such as a motor or optionally a manual hand crank, a mounting bracket 24 mounting the drive means 20 to the wall of the door 8, a glider assembly 100 fixedly attached to the windowpane with bolts, brackets or other suitable attachment means, and sliding on a rail or track 104, and a cable assembly 11, comprising a cable or cables 12, guide means, such as pulleys or sliders, for guiding the cable from the drive means 20 to the glider assembly 100, and a conduit 14 covering at least a portion of the cable 12 to protect it from dirt and wear, and to restrict the free motion of the cable. Typically the conduit is positioned as shown in FIG. 1, between each guide means and the drive means 20.

Figure 2A:
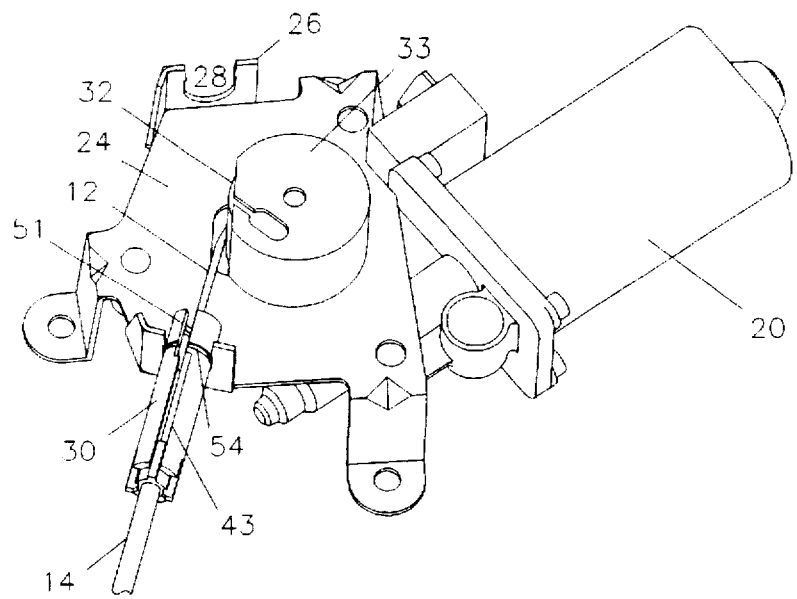
FIG. 2A is an enlarged view of area X of the cable-drum regulator assembly of FIG. 1, showing the mounting bracket and operating position of the retainer assembly.
Figure 2B:
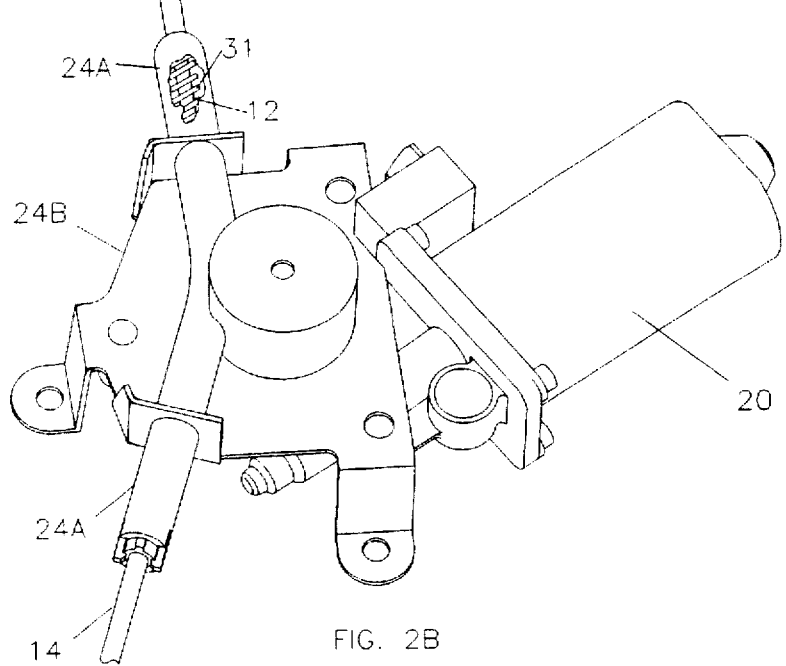
FIG. 2B is an alternative embodiment showing a pair of unitary retainer assemblies and bracket.

As seen in FIGS. 1 and 2A, the drive means 20 imparts rotary motion to a drive drum 32. Preferably, the drum is partially covered by a drum housing 33 to keep dirt and other elements from interfering with the operation of the regulator. Rotary motion of the drive drum 32 is transferred to the glider assembly 100 and to the windowpane 9 by the cable 12. Wrapped around the drive drum is the cable or, more commonly, a pair of cables 12. Each end of each cable has a cable end ball 13, also known as a puck or swage. In designs using a pair of cables, one end of each cable is attached in a slot in the drum 32, and the other ends are attached to the glider assembly 100.

Operation of the drive means 20 rotates the drum 32, unwinding one cable 12 in one direction and winding the other cable 12 in the opposite direction. In this way the cables transfer the necessary forces from the drive means to the glider assembly to raise and lower the window.

During operation of the cable-drum regulator assembly 10, the cables 12 may become temporarily slack when the windowpane 9 reaches either end of its travel path. In addition, repeated cycling of the regulator can cause wear in the system, reducing the cable travel path, causing the cables 12 to become slack. Springs 31 are used to take up this slack.

It is a highly advantageous feature to secure the spring 31 to the cable 11 prior to attaching the cable to the drum 32. Restricting the spring to the cable assembly prevents the spring from falling off or interfering with attachment of the cable to the drum during assembly. This is accomplished by using at least one and preferably two retainer assemblies 30.

In a first preferred embodiment shown in FIGS. 3 and 4, the retainer assembly 30 has a retainer 40 and an endpiece 55 which fit together, preferably snap fit together, to secure the spring 31, typically a coil spring, to the cable assembly. The retainer 40 is seen to have a generally hollow interior 41 sized to receive the cable 12 and the spring 31. The retainer has a first end 52 with an opening 53 to receive the cable 12, and a second end 58 sized to receive the endpiece 55. In a highly advantageous feature, the first and second ends of the retainer are connected by a slot 51. The slot is sized to allow the cable 12 to be inserted into the interior of the retainer body. The retainer assembly 30 can be assembled to the cable 12 prior to formation of end ball 13. This is important since it allows assembly of the regulator even if, as is often the case, the cable end balls 13 are already attached to the cable assembly 11 prior to final assembly.

In FIGS. 3 and 4 the slot 51 is seen to extend from the opening 53 to a jog 49 to a first channel 43. A second channel 42 is provided running parallel to the first channel, and terminating at a second channel end 50. To enhance the rigidity of the retainer, the second channel is preferably an interior groove, although it would be readily apparent to those skilled in this area of technology to extend the second channel 42 through the entire cross section of the retainer 40.

The retainer is shown in FIG. 3 to have a pair of flexible fingers 44, 45 extending axially from the opening at the second end 58 of the retainer. These fingers have retaining digits or teeth 46, 47, pointing radially inwardly towards one another. The digits have beveled surfaces to guide the insertion of the endpiece into the retainer interior 41. The digits 46, 47 captivate the endpiece 55 when it is inserted into the retainer. At least one side wall 48 of the retainer may extend out approximately the length of the fingers to assist in securing the endpiece inside the retainer.

The endpiece 55 has an interior cylindrical opening 57 and endpiece wings or projections 56. The opening 57 is preferably sized to fit snugly over the conduit 14, for example, by a friction fit, although it would be readily apparent to those skilled in this area of technology that in designs that do not employ a conduit the endpiece 55 could be attached to the cable 12. The endpiece wings 56 are sized to fit into the channels 42, 43. During assembly, the endpiece 55 is attached to the conduit and the spring 31 is inserted over the cable 12. The cable is inserted into the retainer 40, followed by the spring 31. When the endpiece is inserted into the retainer, the wings 56 are sliding received in the channels 42, 43. The fingers 44, 45 move out of the way of the endpiece until the endpiece passes the teeth 46, 47, then the fingers move radially outward or snap back into position to captivate the endpiece 55, the spring 31 and the cable 12 therein.

As the cable travel path increases with wear, the springs bias the endpiece out and away from the retainer 40. The travel path of the endpiece is restricted to the length of the channels 42, 43 by the fingers 44, 45.

As seen in FIG. 2A, the drive means is secured to the door by the mounting bracket 24. The mounting bracket has a projection 26 with a U-shaped receiving opening 28. The retainer 40 is attached to the mounting bracket by at least one exterior groove 54 which sits in the U-shaped opening 28 of the bracket 24. As an optional construction shown in FIG. 2B, the retainers and the mounting bracket may be made of a one-piece, unitary construction 24B, eliminating the need for the exterior grooves and reducing the number of parts in the assembly. A slot corresponding to slot 51 and channel 43 in FIG. 2A runs along the underside of the unitary assembly to allow insertion of the cable.

In accordance with a second preferred embodiment of the retainer assembly, as seen in FIGS. 5–7, the endpiece 74 has flexible lateral projections or wings 75 and an interior cylindrical opening 76 which fits over a conduit 14. The retainer 60 has a first retainer end 63 with an opening 64 sized to receive the cable, a second retainer end 65, and preferably a pair of generally diametrically opposed slots 62 running along a significant portion of the length of the retainer 60. As the endpiece is inserted into the retainer, the slots 70 are angled to guide the endpiece wings by a barrier 72. Once the endpiece moves past the barrier, the wings move or snap out in the slots, securing the endpiece to the retainer and the spring inside the endpiece. The travel 20 path of the endpiece is limited to by the end of the slot on one side and the barrier 72 at the second side. In the embodiment shown, the retainer assembly must be attached to the cable 12 prior to the attachment of the cable end ball 13, due to the size of the opening 64 at the first retainer end. However, it is readily apparent to those skilled in this technology that the opening may be enlarged or the ball reduced in size to allow the use of a cable with a preattached ball to pass through the opening.

In view of the foregoing disclosure, those who are skilled in this area of technology will recognize that various modifications and additions can be made to the preferred embodiments discussed above without departing from the true scope and spirit of the present invention. All such alternative embodiments are intended to be covered by the following claims.

What is claimed is:

1. A cable-drum regulator for controlling the movement of a windowpane, comprising, in combination:

drive means for moving the windowpane;

a cable assembly for connecting the drive means to the windowpane, comprising a cable and a spring maintaining tension in the cable, the spring being positioned coaxially around the cable; and a retainer assembly for securing the spring on the cable, comprising:

a retainer having a first end and a second end and a hollow interior sized to receive the cable and the spring, and an endpiece which secures the spring in the retainer, inserted in the second end of the retainer, being axially slidably interconnected with the retainer after insertion into the retainer.

2. The cable-drum regulator of claim 1 wherein the retainer has an opening at the first end sized to allow passage of the cable and sized to restrict the spring within the retainer.

3. The cable-drum regulator of claim 1 wherein the endpiece snap fits into the retainer.

4. The cable-drum regulator of claim 1 wherein the cable assembly further comprises a conduit covering at least part of the cable, and the endpiece is secured to the conduit.

5. The cable-drum regulator of claim 1 further comprising a mounting bracket for securing the drive means to a wall.

6. The cable-drum regulator of claim 5 wherein the retainer is unitary with the mounting bracket.

7. The cable-drum regulator of claim 5 wherein the retainer is secured to the mounting bracket.

8. The cable-drum regulator of claim 7 wherein the mounting bracket is provided with a projection having a U-shaped receiving opening and the retainer is provided with an exterior groove which seats the retainer in the receiving opening of the mounting bracket.

9. The cable-drum regulator of claim 1 wherein the retainer has first and second longitudinal channels and the endpiece has a pair of wings sized to fit into the channels.

10. The cable-drum regulator of claim 9 wherein the retainer has a pair of flexible fingers with retaining digits and the endpiece is secured within the retainer by the retaining digits.

11. The cable-drum regulator of claim 10 wherein the retainer further comprises a retainer wall portion extending substantially the length of the flexible fingers to aid the fingers in the retention of the endpiece.

12. The cable-drum regulator of claim 9 wherein the first end of the retainer is provided with a cable opening, and the retainer has a slot connecting the cable opening to the first of the channels, allowing insertion of the cable into an interior of the retainer.

13. A cable-drum regulator for controlling the movement of a windowpane comprising, in combination:

drive means for moving the windowpane;

a cable assembly for connecting the drive means to the windowpane, comprising a cable and a spring maintaining tension in the cable, the spring being positioned coaxially around the cable;

a retainer assembly for securing the spring on the cable, comprising:

a retainer having first and second longitudinal channels, first and second ends and a hollow interior sized to receive the cable and the spring, and an endpiece that attaches to the retainer at the second end, having a pair of wings sized to fit into the channels, the endpiece securing the spring in the retainer;

wherein the first end of the retainer is provided with a cable opening, the retainer has a slot connecting the cable opening to the first of the channels, allowing insertion of the cable into an interior of the retainer, and the channels are of equal length, the first channel ending at a jog and the second channel ending at a channel end, with the channel end and jog acting to limit a travel path of the endpiece when the endpiece wings contact the jog and the channel end.

14. A cable-drum window regulator for opening and closing a windowpane slidably mounted in a window aperture in a motor vehicle body, comprising, in combination:

a glider assembly;

attachment means for connecting the windowpane to the glider assembly;

drive means for moving the windowpane from a closed position to an open position, the drive means including a rotatable drive drum;

a mounting bracket for securing the drive means to a wall of a motor vehicle body;

a pair of cables with a portion of their length covered by a conduit, each attached at one end to the drive drum and at the other end to the glider assembly;

a pair of springs, each biasing one of the cables to a taut position; and a pair of retainer assemblies, each comprising a retainer and an endpiece axially slidably connected to a corresponding one of the retainers after insertion into the retainer, each retainer having a hollow interior sized to receive one cable and one spring coaxially, and an opening at one end sized to allow passage of the cable and the spring into the retainer, each endpiece snap fitted into its respective retainer at a second end, and each of the retainers capturing the corresponding spring between the retainer and the endpiece.

15. A cable-drum regulator cable assembly, comprising, in combination:

a conduit having a free end;

a cable, a portion of which extends coaxially with the conduit;

a spring coaxial with the cable;

a retainer assembly securing the spring on the cable, comprising: a retainer having an interior sized to receive the spring, the cable passing coaxially through the interior; and an endpiece mounted on the conduit and coaxially slidably attached to the retainer after insertion into the retainer, securing the spring in the interior.

16. A cable-drum regulator for controlling movement of a windowpane, comprising, in combination:

a glider assembly for fixed attachment to a windowpane and sliding attachment to a rail;

drive means for generating force for moving the windowpane;

a conduit;

a cable, at least a portion of the cable extending coaxially within the conduit, interconnecting the drive means and the glider assembly for transmitting force from the drive means to the glider assembly;

a spring for maintaining the cable in a taut position, and a retainer assembly securing the spring on the cable, comprising:

a retainer having an interior socket sized to receive the spring, the cable passing coaxially through the interior socket; and an endpiece mounted on the conduit and coaxially slidably attached to the retainer after insertion into the retainer, securing the spring in the interior socket.

17. The cable-drum regulator of claim 1 further comprising a mounting bracket for securing the drive means to a wall wherein the retainer is unitary with the mounting bracket.

18. The cable-drum regulator of claim 1 wherein one of the retainer and the endpiece has unitary flexible fingers which snap fit to the other of the retainer and the endpiece.

19. The cable-drum regulator of claim 18 wherein the cable assembly further comprises a second cable and a second spring maintaining tension in a second cable, the second spring being positioned coaxially around the second cable, and a second retainer assembly having a hollow interior to receive the second cable and the second spring.

20. The cable-drum regulator of claim 19 further comprising a drum housing wherein the first and second retainers and the drum housing are unitary with one another.

21. The cable-drum regulator of claim 20 further comprising a mounting bracket for securing the regulator to a wall, wherein the first and second retainers, the drum housing and the mounting bracket are unitary with one another.

22. The cable-drum regulator of claim 21 further comprising a longitudinal slot extending from each second end of each retainer to each first end, for passing each of the cables into the hollow interior of the corresponding retainer.

23. A cable-drum regulator for controlling the movement of a windowpane, comprising, in combination:

drive means for moving said windowpane;

a cable assembly for connecting the drive means to the windowpane, comprising a cable and a spring maintaining tension in the cable, the spring being positioned coaxially around the cable; and a retainer assembly for securing the spring on the cable, comprising:

a retainer having a first end and a second end and a hollow interior sized to receive the cable and the spring, and an endpiece which secures the spring in the retainer, inserted in the second end of the retainer, wherein in response to tension in the cable the endpiece is axially slidable relative to the retainer.

\* \* \* \* \*